Jan. 21, 1964  L. M. FORBUSH  3,118,687
INDEPENDENT FRONT WHEEL SUSPENSION
Filed June 20, 1962  2 Sheets-Sheet 1

INVENTOR.
Lothrop M. Forbush
BY
W. H. Wagner
ATTORNEY

INVENTOR.
Lothrop M. Forbush
BY
W. F. Wagner
ATTORNEY 3,118,687
INDEPENDENT FRONT WHEEL SUSPENSION
Lothrop M. Forbush, Birmingham, Mich., assignor to General Motors Corporation, Detroit, Mich., a corporation of Delaware
Filed June 20, 1962, Ser. No. 203,936
7 Claims. (Cl. 280—96.2)

This invention relates to vehicle suspension and more particularly to independent suspension for the dirigible wheels of a vehicle.

For many years the great majority of passenger vehicles have utilized parallel wishbone independent front wheel suspension of the type wherein the lower arm is considerably greater in length than the upper arm. For purposes of convenience, this form is commonly known as "SLA" independent (short and long arm). However, while SLA independent suspension has in the past afforded a fairly simple means for the suspension designer to produce satisfactory geometry in terms of roll center, camber change and tire scrub, the necessity for a relatively long lower control arm inherently limits freedom of engine placement.

An object of the present invention is to provide an improved independent wheel suspension.

Another object is to provide an independent wheel suspension which simulates the geometry of an SLA suspension without requiring the space for a relatively long lower control arm.

A further object is to provide a simulated SLA independent wheel suspension wherein the wheel is connected to the vehicle by a pair of vertically spaced transversely extending generally wishbone shaped control arms, the lower of which is disposed entirely outboard of the vehicle frame.

Still a further object is to provide a suspension of the type described wherein the lower control arm comprises compound linkage capable of simulating the geometric effect of a control arm of any selected length greater than the actual distance between the inboard and outboard extremities thereof.

These and other objects, advantages and features of the invention will become more fully apparent as reference is had to the accompanying specification and drawings wherein.

Figures 1, 2:
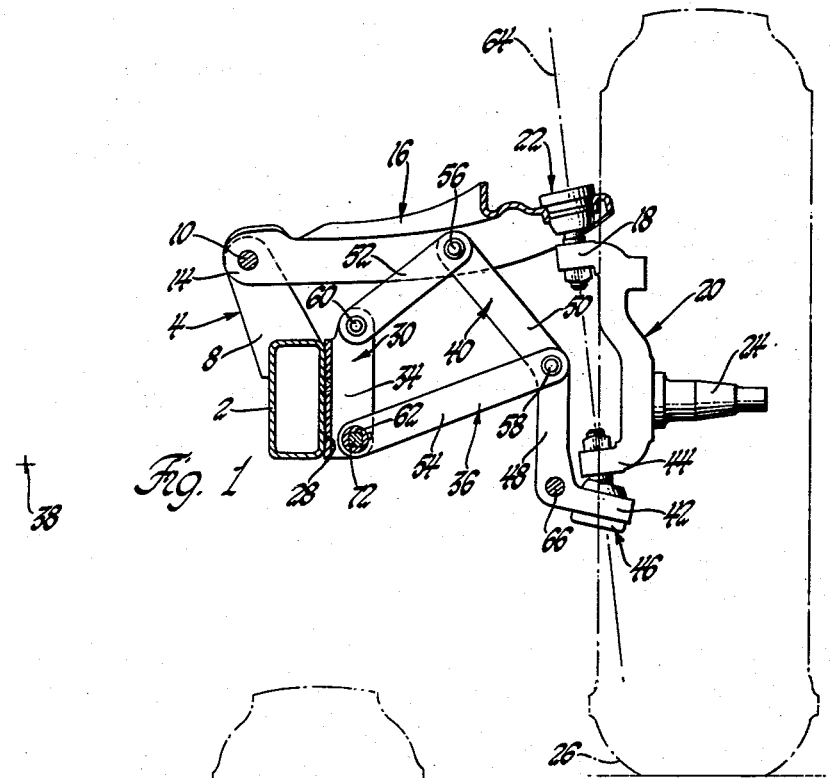
FIGURE 1 is a fragmentary front elevational view of the right front corner of a vehicle illustrating a dirigible wheel suspension construction in accordance with the invention, the various parts being shown in the geometric relation obtaining when the vehicle is at normal design height.
FIGURE 2 is a view similar to FIGURE 1, showing the geometric relationship of the parts when the front of the vehicle has descended substantially in parallel ride deflection.
Figure 3:
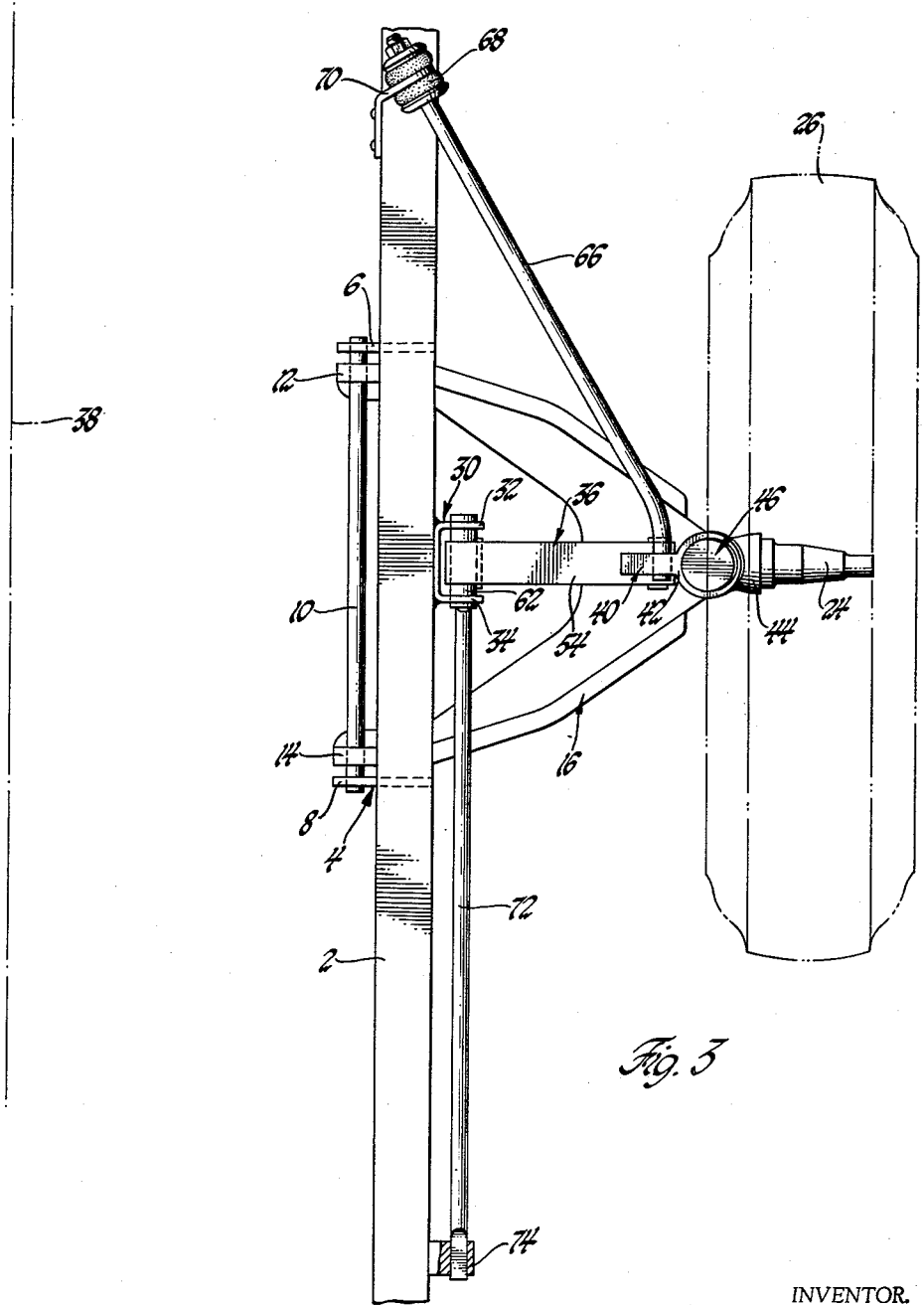
FIGURE 3 is a bottom plan view illustrating additional features of construction of the suspension assembly.

Referring now to the drawings, and particularly FIGURES 1 and 3, there is shown a vehicle suspension arrangement in which the reference numeral 2 generally designates one of a pair of laterally spaced apart longitudinally extending frame side rails. It will be understood that the entire front suspension is symmetrical and, therefore, the left front suspension is identical to the following described right front suspension except in the opposite sense. Side rail 2 has attached thereto an upwardly projecting bracket 4 having longitudinally spaced apart ears 6 and 8 which form the inboard support for opposite ends of a pivot shaft 10 on which is pivotally mounted the bifurcated inboard ends 12 and 14 of a generally wishbone-shape sheet metal upper control arm 16. At its outer end, arm 16 is articulatably connected to the upper end 18 of a generally vertically extending wheel knuckle 20 by a ball joint assembly 22. Knuckle 20 includes a horizontal spindle portion 24 on which the wheel 26 is rotatably mounted. Secured to the outer vertical surface 28 of frame side rail 2 is a vertically extending bracket 30 having longitudinally spaced ears 32 and 34 which provide support for a compound linkage lower control arm assembly 36. Assembly 36 is constructed and arranged geometrically so that the effective axis of motion thereof lies along an imaginary longitudinal axis 38 located substantially inboard of the axis pivot shaft 10 for upper control arm 16.

In accordance with the invention, compound linkage assembly 36 comprises a generally L-shaped vertically extending arm 40 having an outwardly directed lower end portion 42 underlying the lower end of knuckle 20. End portion 42 is articulatably connected to the lower end 44 of knuckle 20 by a ball joint assembly 46. Arm 40 includes a generally vertically extending intermediate portion 48 and an upwardly and inwardly inclined upper end portion 50. Extending between and connecting arm 40 to bracket 30 are a pair of vertically spaced generally laterally extending links 52 and 54. The outboard end of link 52 is pivotally connected to the upper extremity of arm 40 by a shaft 56, while the outboard end of link 54 is connected to arm 40 at the juncture of intermediate and upper end portions 48 and 50 by a shaft 58. The inboard end of link 52 is pivotally connected to the upper end of bracket 30 by a shaft 60. The inboard end of link 54 in turn is pivotally connected to bracket 30 substantially below shaft 60 by a sleeve pin 62. Sleeve pin 62 also serves, in a manner to be described, to establish connection between the suspension and the elastic medium. When arranged in the manner described, the compound linkage forming the lower control arm assembly 36 causes lower ball joint 46 to move during wheel deflection through an angular path similar to that which would occur if joint 46 were mounted on a one piece lower control arm pivoting about the imaginary axis 38. Naturally, the angular path of upper ball joint 22 is determined by an arc described about the axis of pivot 10. Consequently, the front elevational inclination of wheel knuckle 20 is at all times determined by the inclination of an imaginary vertical axis 64 passing through the geometric centers of ball joints 22 and 46. In the illustrated construction, for a given amount of wheel deflection, the upper ball joint 22 moves a greater distance inwardly for a given increment of vertical movement of the wheel than does lower ball joint 46 for the same increment of movement, thereby progressively imparting a negative camber angle to the wheel as the latter moves toward the limit of upward deflection. This, of course, simulates the geometric behavior achieved by conventional SLA suspension, but does not require any of the clearances necessary to accommodate a single rigid arm extending from the ball joint 42 to the imaginary axis 38. In consequence, all of the space between the opposite frame side rails is wholly unobstructed by suspension elements and therefore leaves the designer completely free with respect to power plant installation.

In addition to enabling exact simulation of a conventional SLA suspension, the present invention permits establishment of camber angle patterns which are virtually impossible in a conventional SLA suspension even if space limitations are ignored. For example, imaginary axis 38, if desired, may be located entirely beyond the physical limits of the vehicle. Assume, for example, that a lower control arm is desired, the length of which would require location of axis 38 several feet beyond the extremity of the opposite side of the vehicle. Upon such circumstances, the single lower control arm would not suffice irrespective of interference problems, owing to the inability to establish an actual pivot corresponding to imaginary axis 38. By contrast, with the present invention, after determining the camber requirement, it is only necessary to adjust the length and inclination of links 52 and 54 so that the path of movement of lower ball joint 46 maintains a relationship to the fixed angular path of movement of upper joint 22 which will cause the wheel knuckle to travel in a path paralleling the desired predetermined path.

FIGURE 3 illustrates a preferred means of stabilizing the compound linkage 36 and one mode of connecting an elastic medium for resiliently supporting the vehicle frame relative to the wheel. In the embodiment shown, the rearward end of a tension type strut rod 66 is secured in the lower end portion 42 of arm 40. Strut 66 extends diagonally inwardly and forwardly and is resiliently connected by a compression type rubber mount 68 to a bracket 70 on frame side rail 2. Mount 68 provides a semi-universal connection with the frame having a geometric center which is substantially in alignment with the sleeve pin 62 for link 54. To elastically support the vehicle relative to the wheel, a torsion spring 72 extends rearwardly of sleeve pin 62 and is anchored in a bracket 74 on frame 2. The outer surface of sleeve pin 62 is preferably keyed to link 54 and is provided with socket means for rigidly engaging the forward end of spring 72.

From the foregoing it will be seen that a novel and improved suspension has been provided. In practice, the effective axis 38, FIGURES 1 and 3, may be positioned lower than any physical part of the sprung vehicle, thereby enabling greater clearance from the ground without sacrificing geometrical advantages of a low inner pivot axis. In addition to the freedom of engine placement mentioned, the invention eliminates the requirement for supporting structure adjacent to axis 38, which in the arrangement shown would require either long brackets extending inboard from side rail 2 or a cross member between rail 2. The geometry also permits the frame rail 2 to be disposed lower and closer to the wheel than otherwise possible, thus enabling it to be relatively straighter, simpler to manufacture and ligher for the same stiffness compared with conventional construction in which the space required to clear the path of the lower arm causes the frame side rail to be disposed higher near the centerline of the front wheels even if the lower arm is disposed with its central portion between inner and outer pivots lower than its ends.

While but one embodiment of the invention has been shown and described, it will be apparent that other changes and modifications may be made therein. It is, therefore, to be understood that it is not intended to limit the invention to the embodiment shown, but only by the scope of claims which follow.

I claim:

1. In combination, a vehicle sprung mass, an unsprung mass including a wheel supporting knuckle, a single transversely extending upper arm having bifurcated inner ends pivotally connected to said sprung mass on a fixed generally horizontal axis and an outer end universally pivotally connected to the upper end of said knuckle, a three element compound linkage lower control arm assembly disposed entirely outboard of the inboard pivotal connection of said upper control arm interconnecting said sprung mass and the lower end of said knuckle, said lower control arm assembly including a pair of links pivotally mounted at their inboard ends in vertically spaced relation on said sprung mass and pivotally mounted at their outboard ends in vertically spaced relation on a generally vertically extending arm, and means universally pivotally connecting the lower extremity of said last mentioned arm to the lower end of said knuckle.

2. Independent wheel suspension comprising, in combination, a sprung mass, an upper transversely extending control arm having spaced inner ends mounted for pivotal movement on said sprung mass about a generally horizontal longitudinally extending axis, a generally vertically extending wheel supporting knuckle, means pivotally connecting the upper end of said knuckle to the outer end of said arm, a compound linkage assembly disposed between the lower end of said wheel knuckle and said sprung mass outboard of the longitudinally extending axis of said upper arm, said assembly including a generally vertically extending lower control arm having its lower end pivotally connected to the lower end of said knuckle, a pair of links pivotally connected to said lower control arm in vertically spaced relation, and means pivotally connecting said links to said sprung mass in vertically spaced relation.

3. Independent wheel suspension comprising, in combination, a sprung mass, an upper transversely extending control arm having spaced inner ends mounted for pivotal movement on said sprung mass about a generally horizontal longitudinally extending axis, a generally vertically extending wheel supporting knuckle, means pivotally connecting the upper end of said knuckle to the outer end of said arm, a compound linkage assembly disposed between the lower end of said wheel knuckle and said sprung mass outboard of the longitudinally extending axis of said upper arm, said assembly including a generally vertically extending lower control arm having its lower end pivotally connected to the lower end of said knuckle, a pair of non-parallel links pivotally connected to said lower control arm in vertically spaced relation, and means pivotally connecting said links to said sprung mass in vertically spaced relation.

4. Independent wheel suspension comprising, in combination, a sprung mass, an upper transversely extending control arm having spaced inner ends mounted for pivotal movement on said sprung mass about a generally horizontal longitudinally extending axis, a generally vertically extending wheel supporting knuckle, means pivotally connecting the upper end of said knuckle to the outer end of said arm, a compound linkage assembly disposed between the lower end of said wheel knuckle and said sprung mass outboard of the longitudinally extending axis of said upper arm, said assembly including a generally vertically extending lower control arm having its lower end pivotally connected to the lower end of said knuckle, a pair of non-parallel links pivotally connected to said lower control arm in vertically spaced relation, and means pivotally connecting said links to said sprung mass in vertically spaced relation and laterally outwardly of said axis for said upper control arm.

5. The structure set forth in claim 4 wherein said generally vertically extending arm includes a laterally inwardly inclined upper portion and the upper of said pair of links normally extends between said sprung mass and the upper end portion is an upwardly and outwardly inclined attitude.

6. The structure set forth in claim 5 including a strut rod rigidly connected to the lower end of said lower control arm and pivotally attached to said sprung mass forwardly of said linkage.

7. The structure set forth in claim 6 including an elastic load supporting medium reacting between one of said arms and said sprung mass.

References Cited in the file of this patent

UNITED STATES PATENTS

| 2,123,305 | Hierta | July 12, 1938 |
| 2,314,076 | Casner | Mar. 16, 1943 |
| 2,972,489 | Collier et al. | Feb. 21, 1961 |
| 3,033,586 | Rosenkrands | May 8, 1962 |